United States Patent
Fahrbach

(10) Patent No.: US 12,092,807 B2
(45) Date of Patent: Sep. 17, 2024

(54) OPTICAL SYSTEM WITH A TILTED ILLUMINATION PLANE AND METHOD FOR ILLUMINATING A SAMPLE VOLUME IN AN OPTICAL SYSTEM WITH A TILTED ILLUMINATION PLANE

(71) Applicant: LEICA MICROSYSTEMS CMS GMBH, Wetzlar (DE)

(72) Inventor: Florian Fahrbach, Mannheim (DE)

(73) Assignee: LEICA MICROSYSTEMS CMS GMBH, Wetzlar (DE)

( * ) Notice: Subject to any disclaimer, the term of this patent is extended or adjusted under 35 U.S.C. 154(b) by 682 days.

(21) Appl. No.: 17/040,574

(22) PCT Filed: Mar. 14, 2019

(86) PCT No.: PCT/EP2019/056396
§ 371 (c)(1),
(2) Date: Sep. 23, 2020

(87) PCT Pub. No.: WO2019/185360
PCT Pub. Date: Oct. 3, 2019

(65) Prior Publication Data
US 2021/0072524 A1   Mar. 11, 2021

(30) Foreign Application Priority Data
Mar. 29, 2018 (DE) .................... 10 2018 204 940.8

(51) Int. Cl.
*G02B 21/00* (2006.01)
*G02B 21/06* (2006.01)
(52) U.S. Cl.
CPC ..... *G02B 21/0032* (2013.01); *G02B 21/0036* (2013.01); *G02B 21/006* (2013.01)

(58) Field of Classification Search
CPC ................ G02B 21/00; G02B 21/0004; G02B 21/0016; G02B 21/002; G02B 21/0024;
(Continued)

(56) References Cited
U.S. PATENT DOCUMENTS

| 4,795,237 A * | 1/1989 | Kempf ................. G02B 25/007 |
| | | 359/900 |
| 9,030,734 B2 * | 5/2015 | Knebel .............. G02B 21/0076 |
| | | 359/213.1 |

(Continued)

FOREIGN PATENT DOCUMENTS

DE   102011054914 A1   5/2013
WO   WO 2018/041988 A1   3/2018

OTHER PUBLICATIONS

Shin et al. "Oblique scanning 2-photon light-sheet fluorescence microscopy for rapid volumetric imaging," Journal of Biophotonics, vol. 11, No. 5, Dec. 28, 2017, XP055594019.

*Primary Examiner* — Thong Q Nguyen
(74) *Attorney, Agent, or Firm* — LEYDIG, VOIT & MAYER, LTD.

(57) ABSTRACT

An optical system includes an illumination device, an erecting optical unit and a scanning device. The illumination device is configured to generate illumination light. The scanning device is configured to generate a temporal sequence of at least two tilted illumination planes for illuminating a stationary sample volume. The at least two tilted illumination planes are arranged at a distance from one another and parallel to one another.

13 Claims, 5 Drawing Sheets

(58) Field of Classification Search
CPC .......... G02B 21/0028; G02B 21/0032; G02B 21/0036; G02B 21/0052; G02B 21/006; G02B 21/0076; G02B 21/02; G02B 21/025; G02B 21/06; G02B 21/24; G02B 21/241
USPC .................................. 359/368–398, 665–666
See application file for complete search history.

(56) References Cited

U.S. PATENT DOCUMENTS

| | | | |
|---|---|---|---|
| 10,606,056 B2* | 3/2020 | Fahrbach | G02B 21/364 |
| 2012/0140240 A1 | 6/2012 | Hillman et al. | |
| 2013/0107358 A1 | 5/2013 | Knebel et al. | |
| 2013/0220806 A1* | 8/2013 | Iwaya | H01J 37/20 |
| | | | 204/298.36 |
| 2016/0202462 A1* | 7/2016 | Levecq | G02B 21/241 |
| | | | 250/234 |
| 2017/0059840 A1* | 3/2017 | Tamano | G02B 21/0024 |
| 2019/0129156 A1* | 5/2019 | Knebel | G02B 21/367 |
| 2019/0204578 A1 | 7/2019 | Fahrbach | |
| 2021/0165176 A1* | 6/2021 | Chang | G02B 6/4257 |

* cited by examiner

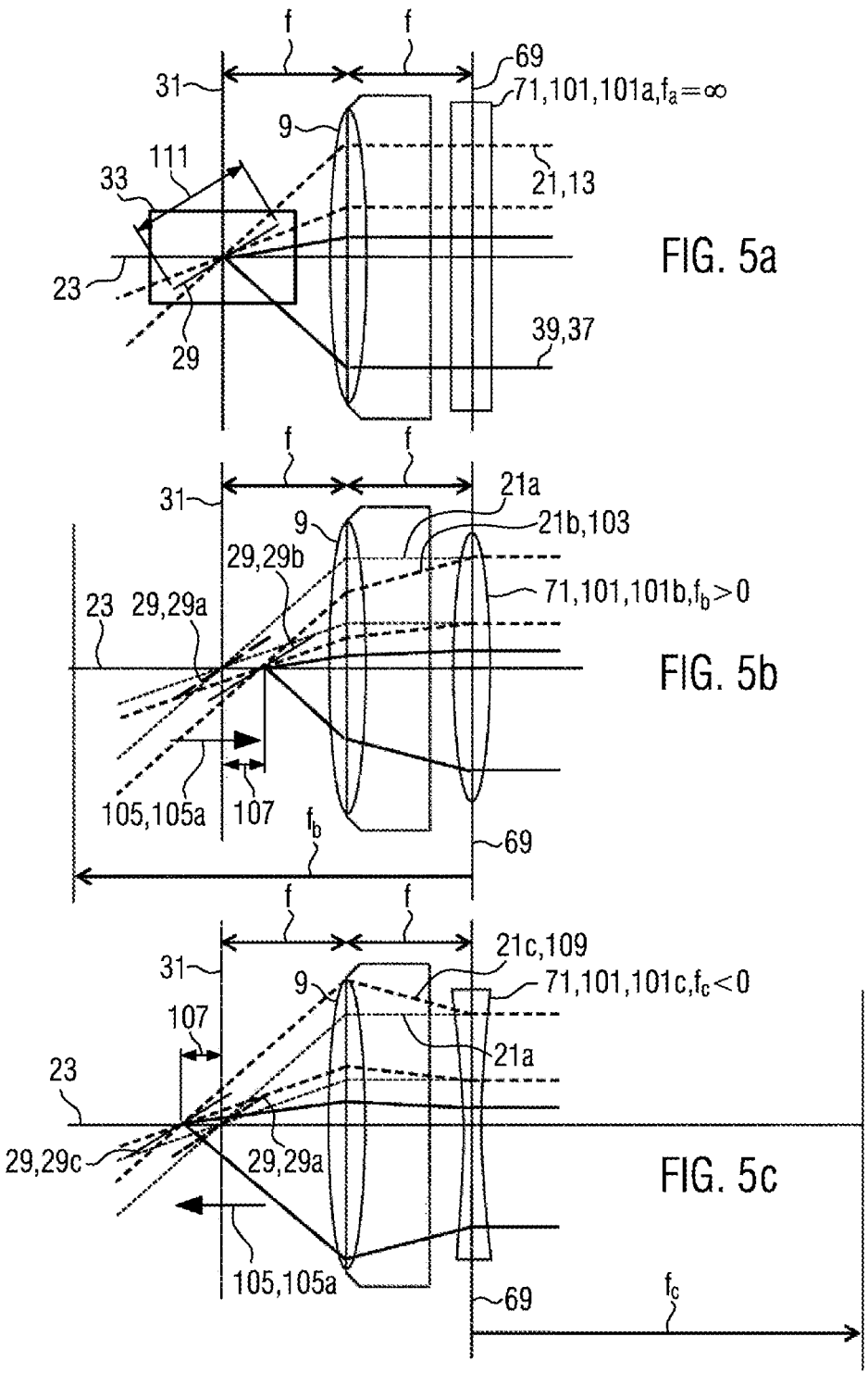

OPTICAL SYSTEM WITH A TILTED ILLUMINATION PLANE AND METHOD FOR ILLUMINATING A SAMPLE VOLUME IN AN OPTICAL SYSTEM WITH A TILTED ILLUMINATION PLANE

CROSS-REFERENCE TO PRIOR APPLICATIONS

This application is a U.S. National Phase Application under 35 U.S.C. § 371 of International Application No. PCT/EP2019/056396, filed on Mar. 14, 2019, and claims benefit to German Patent Application No. DE 10 2018 204 940.8, filed on Mar. 29, 2018. The International Application was published in German on Oct. 3, 2019, as WO 2019/185360 A1 under PCT Article 21(2).

FIELD

The invention relates to an optical system, comprising an illumination device for generating illumination light, an erecting optical unit and a scanning device for generating a temporal sequence of at least two tilted illumination planes for illuminating a stationary sample volume. Furthermore, the invention relates to a method for illuminating a sample volume, in particular in an optical system with a temporal sequence of tilted illumination planes in a stationary sample volume.

BACKGROUND

Optical systems which illuminate a sample by means of a preferably two-dimensional light distribution, i.e. a light sheet, have the advantage that is it possible to achieve a high resolution by means of the locally delimited illumination, and also a low loading, for example by bleaching. However, scanning a three-dimensional sample necessitates illuminating locally different regions of the sample.

For this purpose, in the prior art, for example, the sample is moved, a tilting mirror is arranged in the transmission path of the illumination light, said mirror changing the position of the light sheet in the sample by means of tilting, or an objective is displaced.

SUMMARY

In an embodiment, the present invention provides an optical system which includes an illumination device, an erecting optical unit and a scanning device. The illumination device is configured to generate illumination light. The scanning device is configured to generate a temporal sequence of at least two tilted illumination planes for illuminating a stationary sample volume. The at least two tilted illumination planes are arranged at a distance from one another and parallel to one another.

BRIEF DESCRIPTION OF THE DRAWINGS

Embodiments of the present invention will be described in even greater detail below based on the exemplary figures. The present invention is not limited to the exemplary embodiments. All features described and/or illustrated herein can be used alone or combined in different combinations in embodiments of the present invention. The features and advantages of various embodiments of the present invention will become apparent by reading the following detailed description with reference to the attached drawings which illustrate the following:

FIGS. 5$a$, 5$b$ and 5$c$ show a schematic illustration of the effective principle of the optical system and method according to an embodiment of the invention.

DETAILED DESCRIPTION

Figure 1:
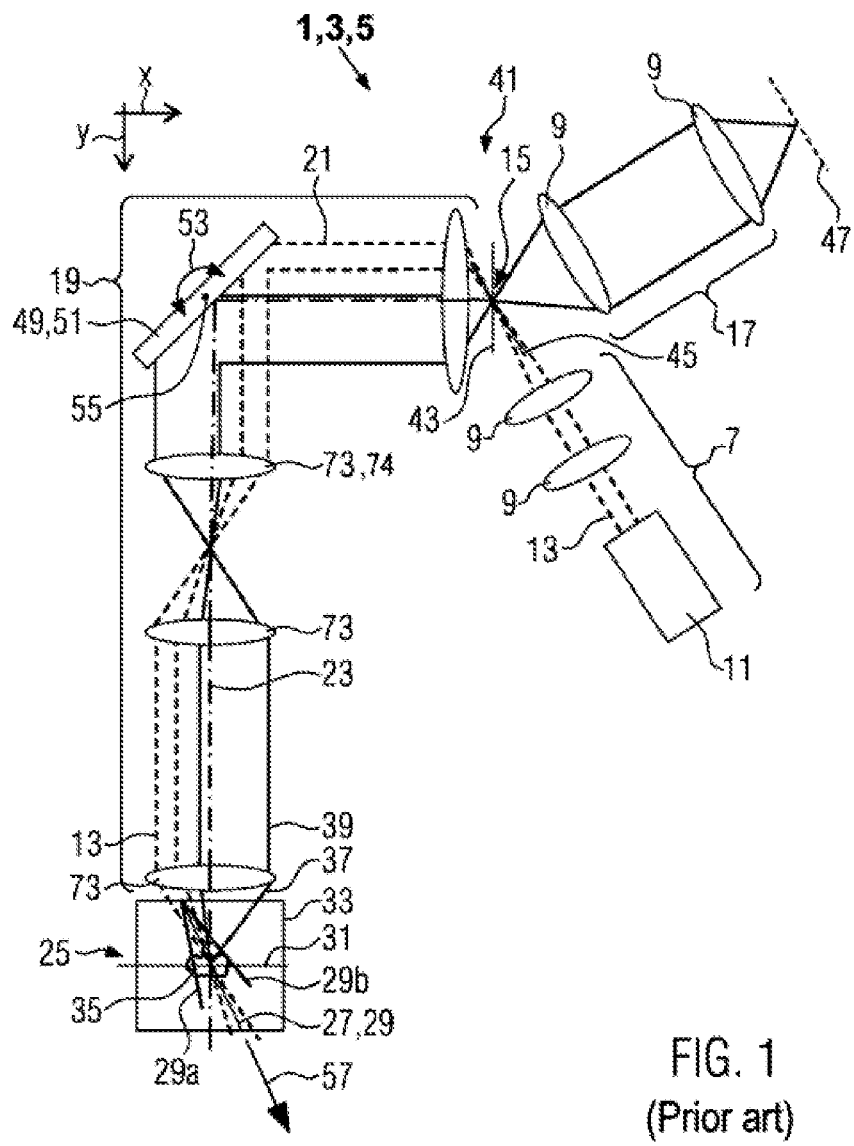
FIG. 1 shows a schematic illustration of an optical system on the basis of the example of a SCAPE microscope from the prior art.

It is disadvantageous in the solutions from the prior art that inhomogeneous illumination can occur over the sample volume.

The optical system according to an embodiment of the invention solves this problem by virtue of the fact that the at least two tilted illumination planes are arranged at a distance from one another and parallel to one another.

The method according to an embodiment of the invention solves this problem by virtue of the fact that a scanning device offsets the temporally successive illumination planes parallel to one another.

The optical system according to an embodiment of the invention and the method according to an embodiment of the invention thus have the advantage that in the case of discrete scanning of the sample with different illumination planes, the step size is identical in the entire sample, and in the case of continuous scanning, i.e. sweeping over the sample with the illumination plane, the light energy introduced in the sample volume is constant over the sample.

The optical system according to an embodiment of the invention and the method according to an embodiment of the invention can be further improved by further configurations, each of which is advantageous per se. In this case, technical features of the individual configurations can be arbitrarily combined with one another and/or omitted, provided that the technical effect achieved by the omitted technical feature is not of importance.

The optical system according to an embodiment of the invention can be a microscope and in particular a three-dimensional (3D) scanning, oblique plane microscopy (OPM) or swept confocally-aligned planar excitation (SCAPE) microscope. Furthermore, the optical system can also be an endoscopic system.

In the method according to an embodiment of the invention, correspondingly, the sample volume of a microscope, and in particular of an endoscopic system, of a 3D scanning, OPM or SCAPE microscope can be illuminated.

The illumination device can comprise a light source, in particular, which generates the illumination light. The illumination light can be monochromatic or continuous, i.e. comprising a wavelength spectrum.

The erecting optical unit should be understood as an optical unit which images an image of the tilted illumination plane in a planar manner in a detector plane. An area sensor is preferably situated in the detector plane.

The stationary sample volume is thus illuminated with at least two illumination planes, preferably with a multiplicity of illumination planes in a temporal sequence, which are arranged parallel to one another. Equidistant sections (in the sense of the two-dimensional regions of the sample that are illuminated in each case by the corresponding illumination planes) of the sample can thus be effected, wherein said sections can be detected and preferably combined to form a three-dimensional image.

In particular, the scanning device can have no mirrors. The optical system thus preferably comprises only transmissive optical elements and, with further preference, can have a linear optical set-up. This is advantageous particularly if miniaturization of the optical system is sought.

In a further configuration of the optical system according to an embodiment of the invention, the scanning device is configured as a focal-length-variable illumination and detection optical unit for the transmission of the illumination light to the sample volume and for the transmission of scattered and/or fluorescent light from the sample volume into the erecting optical unit.

In particular, the illumination light generated by the illumination device can be fed non-collinearly into the focal-length-variable illumination and detection optical unit, such that said light likewise passes non-collinearly in the illumination and detection optical unit.

The illumination light emerging from the illumination and detection optical unit can furthermore form the tilted illumination plane in the sample volume and illuminate, if present, a plane of the sample. The cross section of the sample is obtained if the sample is at least semitransparent or contains scattering centers. If the sample is one that is nontransmissive to light, then only a peripheral contour of the sample is illuminated.

Scattered and/or fluorescent light is scattered or generated in the sample volume, in particular in the sample, and can be emitted respectively into a half-space. The scattered and/or fluorescent light emitted into one of the two half-spaces is collected by the illumination and detection optical unit and transmitted along a non-collinear path from the sample volume to the erecting optical unit. In this case, the paths of the illumination light and of the scattered and/or fluorescent light preferably differ from one another.

The illumination and detection optical unit can thus image a focus of the illumination light on an illumination side in the form of the tilted illumination plane into the sample volume arranged on the sample side and at the same time image the scattered and/or fluorescent light emitted from the illumination plane into a half-space, said scattered and/or fluorescent light representing a cross section of a sample, from the sample volume on the sample side to the illumination side. The imaged intermediate image can furthermore preferably be imaged onto a sensor by the erecting optical unit.

The method according to an embodiment of the invention corresponding to the device can thus comprise the following steps: feeding illumination light of an illumination device into a scanning device configured as an illumination and detection optical unit and transmitting the illumination light along a non-paraxial illumination path; transmitting the illumination light through a focal-length-variable scanning device and varying the convergence and/or divergence of the illumination light by means of the focal-length-variable scanning device; illuminating the sample volume with the tilted illumination plane, wherein varying the convergence and/or divergence of the illumination light by means of the focal-length-variable scanning device brings about parallel displacement of the tilted illumination plane along an optical axis of the scanning device; collecting scattered and/or fluorescent light from the sample volume by means of the scanning device and transmitting the scattered and/or fluorescent light along a non-paraxial detection path by means of the focal-length-variable scanning device; and erecting the scattered and/or fluorescent light by means of an erecting optical unit.

In the above method according to an embodiment of the invention, the scanning device can be configured as a focal-length-variable illumination and detection optical unit.

In particular, in a further configuration of the optical system according to an embodiment of the invention, the illumination and detection optical unit can comprise a focal-length-variable optical element. This has the advantage that a mechanical variation of an optical arrangement (such as in a zoom optical unit, for example) can be dispensed with in some configurations.

In a further configuration, the focal-length-variable optical element can be configured, in particular, as an electrically or electronically tunable lens. Such an electronically tunable lens, designated hereinafter by ETL (stands for: electrically tunable lens), allows the focal length of the illumination and detection optical unit to be varied electronically, without having recourse to a mechanical variation of individual components.

An ETL, particularly owing to its small dimensions, can advantageously be arranged in the illumination and detection optical unit. An ETL can be realized for example by a liquid enclosed by a transparent membrane (i.e. a membrane that is transmissive to the illumination light). In the case of such an ETL, the liquid from a reservoir can be pumped back and forth into the region enclosed by the membrane in order thus to change the focal length of the ETL. A further possible ETL can be based on the principle of electrowetting or of inducing a standing soundwave in a cylindrical liquid reservoir. Focal-length-variable Alvarez-Lohmann lenses or diffractive tunable lenses are likewise conceivable.

With regard to the inertia of the elements to be moved, a sensitivity of the sample vis a vis vibrations occurring during the movement, and a complexity of the necessary beam path, this configuration of an embodiment of the present invention improves the solutions from the prior art to the effect that the optical system according to an embodiment of the invention is configured with less complexity, a movement of the sample is not necessary and homogeneous sample illumination is ensured.

In a further configuration of the optical system according to an embodiment of the invention, the focal-length-variable optical element can be arranged in a pupil of the illumination and detection optical unit. Such an arrangement has the advantage that although the focal-length-variable optical element changes the focal length of the illumination and detection optical unit, the imaging scale is maintained.

In particular, the illumination and detection optical unit can comprise a so-called 4f set-up, wherein a focus of the illumination light focused by the illumination device is arranged at an illumination-side focal length, the pupil is at a distance from the position of said focus amounting to twice the focal length in the direction of the sample volume, and the illumination plane is formed at the sample-side focal length. A length between the illumination-side focus of the illumination device and the illumination plane formed thus amounts to four times the focal length. In such a configuration, the pupil is formed centrally between the illumination-side focus and the illumination plane and the focal-length-variable optical element can be arranged in this position.

In some configurations, it is possible that the pupil is not accessible and a telescope can thus be provided in the illumination and detection optical unit, which telescope images a pupil of a partial optical unit of the illumination and detection optical unit, wherein the focal-length-variable optical element is arranged in the position of the imaging of the pupil. In other words, in this configuration of the optical system, the illumination and detection optical unit consists of at least two partial optical units, for example objectives, wherein the pupil of a respective partial optical unit can be situated in a housing. Consequently, the location of the pupil is not accessible.

In this configuration, it is thus possible to arrange a further 4f set-up in the form of the telescope between the partial optical units, such that each of the pupils of the partial optical unit is imaged in a central focus region. The latter can furthermore be freely accessible and allow the positioning of a focal-length-variable optical element.

Any desired number of such (telecentric) 4f set-ups can be introduced into the optical system according to an embodiment of the invention, such that the optical system is also usable with objective and tube lens combinations known from the prior art if the additional 4f set-up is inserted between the tube lenses, the tunable lens being positioned in the common focal plane of said set-up.

Furthermore, the optical system according to an embodiment of the invention can be improved by a further focal-length-variable optical element being provided, by means of which a magnification of the optical system is changeable. This effect is achieved if the further focal-length-variable optical element is provided at a position that does not correspond to the pupil. The imaging scale of the illumination and detection optical unit is varied in the case of such an arrangement.

This configuration thus makes it possible, by means of a purely electrical control, both to scan the sample and to vary a magnification of the scanned region.

In a further configuration of the optical system according to an embodiment of the invention, the illumination device and the erecting optical unit can be configured to be rotatable with one another about an optical axis of the illumination and detection optical unit. The corresponding method according to an embodiment of the invention can thus furthermore comprise jointly rotating an illumination device and an erecting device about an optical axis of the scanning device for illuminating the sample volume from different directions.

In the solutions in the prior art, the illumination by means of the tilted illumination plane is usually effected statically from preferably one direction. In the case of a sample that is nontransmissive to light or a sample having regions that are nontransmissive to light, this can result in shadow casting that does not allow the sample to be imaged with sufficient quality or has the effect that structures lying in the shadow cannot be detected.

Consideration will now be given, purely by way of example, to the illumination of a sample by means of a tilted illumination plane which is illuminated along a first illumination direction. It is assumed that the optical axis of the illumination and detection optical unit extends along a z-axis and the first illumination direction is arranged, purely by way of example, at an angle of 45° with respect to the optical axis. If the illumination device and the erecting optical unit are now rotated with one another about the optical axis, then the illumination direction describes a kind of swaying movement around the optical axis. If the illumination device and the erecting optical unit are rotated with one another by exactly 180° around the optical axis, then a second illumination direction is obtained, which is perpendicular to the first illumination direction. If a structure that is nontransmissive to light is situated at the point of intersection between the first illumination direction and the optical axis, as a result of the rotation of the illumination plane about the optical axis the influence of the shadow can be at least minimized since even a possible umbra of the structure that is nontransmissive to light is minimized.

Volumetric data of an object, that is to say of a sample, can preferably be recorded by the optical system and method according to an embodiment of the invention. The scanning of the sample by means of the tilted illumination planes arranged parallel to one another can be referred to as "remote focusing". This means that neither the object itself nor the illumination and detection optical unit facing the object is moved.

In set-ups of SCAPE microscopes known from the prior art, one disadvantage is that the beam path has to be angled, the beam path typically being bent by 90° at the location of a scanning mirror. Such an arrangement furthermore has the disadvantage that the scanning mirror necessarily has to lie outside an existing housing of, for example, an objective. Furthermore, this narrow delimitation of the scanning region can result in instances of darkening in edge regions of the image and the scanning mirror, which generally carries out a (resonant) oscillation, has to be repeatedly accelerated and decelerated. Although a linear movement of a scanning mirror is possible by means of sawtooth-type control, this results in a high power consumption and possible heating.

In general, an embodiment of the present invention moves the image plane relative to the object. In this case, the image plane is that plane which is illuminated and from which emanating scattered and/or fluorescent light is imaged onto a preferably fixed area sensor.

An embodiment of the present invention is advantageous particularly in the course of possible miniaturization of an optical system, in particular of a 3D scanning, OPM or SCAPE microscope, since a deflection of the beam path such as is necessary in the case of known scanning mirrors can be dispensed with. The optical system according to an embodiment of the invention can thus be configured linearly, for example on an endoscope, wherein preferably optical waveguides, in particular optical fibers, can be used in order to transmit the illumination light to the sample volume and/or to transmit the collected scattered and/or fluorescent light from the illumination plane to the erecting optical unit.

The optical system according to an embodiment of the invention and also the method according to an embodiment of the invention can be characterized by a maximum displacement of the illumination plane along the optical axis. Said maximum displacement is attributable to a maximum possible change in refractive power of the ETL. In some configurations, the refractive power changes around the value 0 to positive and negative values. It is likewise conceivable for the change in refractive power to vary only in the range of positive or negative values. In such cases, a compensation optical unit is able to be employed, by means of which this refractive power offset can be set to the value 0, with the result that a change in refractive power around the value 0 is once again possible.

In some configurations, the maximum possible change in refractive power of the ETL can be 10 diopters, in particular from −5 diopters to +5 diopters. In general, the refractive power D is: $D_{min} \leq D \leq D_{max}$, wherein both $D_{min}$ and $D_{max}$ can assume an arbitrary value between −10 diopters and +10 diopters provided that $D_{min} < D_{max}$ is satisfied.

Embodiments of the present invention is explained in greater detail below on the basis of exemplary configurations with reference to accompanying drawings. The drawings each show intrinsically advantageous specific configurations of embodiments of the invention, wherein technical features of the configurations are arbitrarily combinable with one another and can be omitted, provided that the technical effect achieved by the omitted technical feature is not of importance. Identical technical features and features having an identical technical effect are provided with the same reference sign for the sake of clarity.

FIG. 1 shows an optical system 1 from the prior art. The optical system 1 is, purely by way of example, in particular a 3D scanning microscope 3 configured as a SCAPE microscope 5.

The SCAPE microscope shown comprises an illumination device 7, comprising purely by way of example two lenses 9 and a light source 11 illustrated schematically as a rectangle.

The light source 11 emits illumination light 13, which is focused at an illumination focus 15.

The SCAPE microscope 5 furthermore comprises an erecting optical unit 17, likewise comprising two lenses 9 purely by way of example.

Furthermore, the SCAPE microscope 5 comprises an illumination and detection optical unit 19, likewise comprising a plurality of lenses purely by way of example, said lenses not being provided with reference signs for the sake of clarity. Furthermore, it should be mentioned that the designation "optical unit" should be understood to mean both a single optical element and an arrangement of any desired number of optical elements. In this case, besides lenses 9, the optical elements can also be optical filters or refractive and/or diffractive optical elements.

The illumination and detection optical unit 19 has a non-paraxial illumination path 21, which is represented by a dashed line and extends at a distance from an optical axis 23 of the illumination and detection optical unit 19.

The illumination and detection optical unit 19 focusses the illumination light 13 on a sample side 25 in the form of a light sheet 27 representing an illumination plane 29, which is tilted relative to the optical axis 23 and respectively relative to a sample-side focal plane 31.

The illumination plane 29 is formed in a stationary sample volume 33, which is shown purely schematically and in which a sample 35 can be situated. The sample 35 can be sensitive vis a vis vibrations, in particular, such that a movement of said sample is precluded for the examination thereof.

Scattered and/or fluorescent light 37 is emitted by the sample, i.e. scattered and/or generated in a fluorescence process occurring in the sample 35.

The scattered and/or fluorescent light 37 is collected by the illumination and detection optical unit 19 and transmitted along a detection path 39, likewise non-paraxially from the illumination and detection optical unit 19 from the sample side to an illumination side 41, on which the illumination focus 15 is situated, for example.

A principle of the SCAPE microscope 5 is that both the illumination light 21 and the scattered and/or fluorescent light 37 are transmitted by one and the same optical unit. This has the consequence that the illumination focus 15 coincides with an imaging focus 43 at least in portions. This is shown by way of example on the basis of a real intermediate image 45 of the illumination plane 29.

Said real intermediate image 45 is imaged onto a sensor 47 in a planar manner by the erecting optical unit 17, that is to say that the real intermediate image 45 is erected.

The illumination and detection optical unit 19 furthermore comprises a scanning device 49, which is configured as a tilting mirror 51 (also called galvanometer mirror 51) in the shown configuration of the SCAPE microscope 5 from the prior art.

The tilting mirror 51 is rotatable about a tilting axis 55 along a tilting direction 53, wherein such a rotation leads to a variation of the location of the illumination planes 29 formed. This is illustrated, purely by way of example and depicted in an exaggerated manner, by a second illumination plane 29a and a third illumination plane 29b in FIG. 1. The illumination planes 29 formed are thus moved over the sample volume 33 in a movement that is similar to the movement of a windshield wiper. Different illumination planes 29 are thus at different distances from one another along their respective illumination direction 57 (the illumination direction 57 for the illumination plane 29 is depicted).

Figure 2:
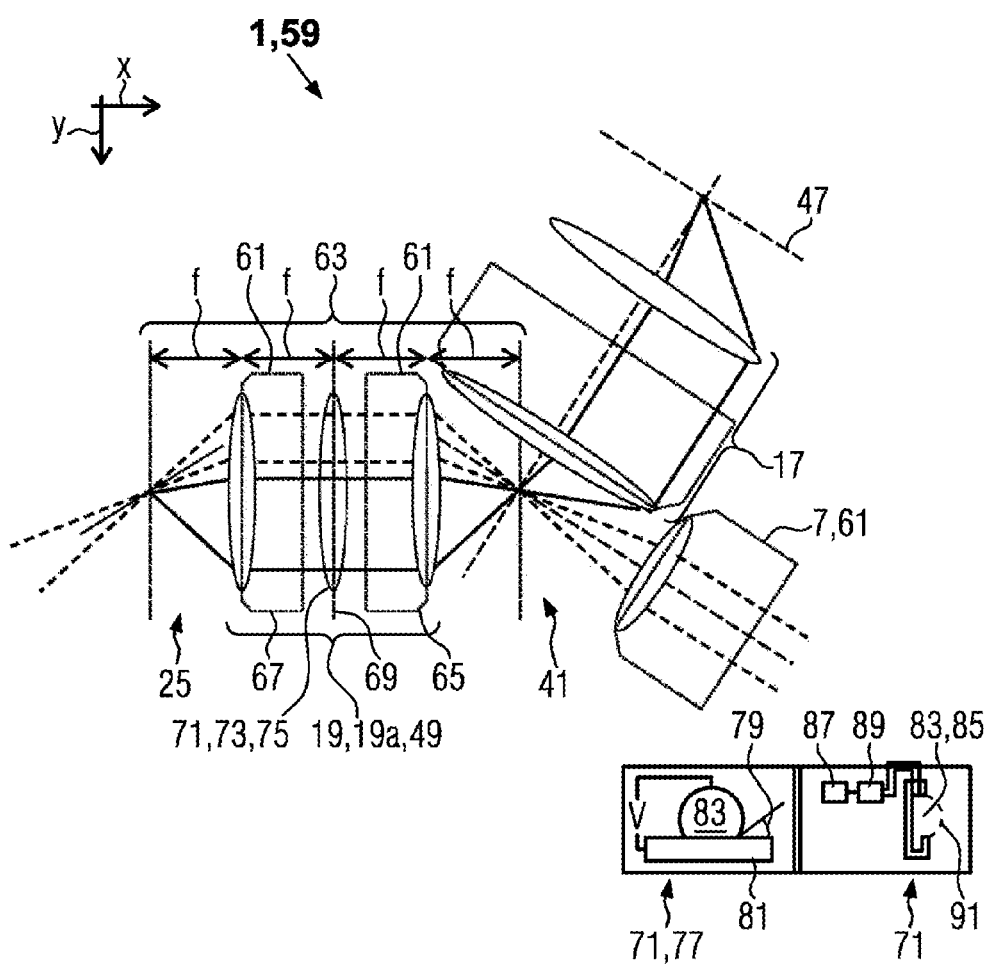
FIG. 2 shows a schematic illustration of a first configuration of an optical system according to the invention.

FIG. 2 shows a first configuration of the optical system 1 according to an embodiment of the invention in the form of an OPM microscope 59.

The OPM microscope 59, too, has the illumination direction 7 (indicated here as objective 61), the erecting optical unit 17 with the sensor 47, and the illumination and detection optical unit 19.

Fundamental differences with respect to the prior art can be discerned, in particular, in the illumination and detection optical unit 19 configured as a scanning device 49. Said illumination and detection optical unit is configured in the so-called 4f set-up 63, wherein the illumination focus 15 is situated at a focal length f on the illumination side 41, and the sample-side focal plane 31 is likewise situated at the focal length f, but on the sample side 25.

Furthermore, a focal-length-variable optical element 73 configured as an electronically tunable lens 71 is arranged both at the focal length f of a first partial optical unit 65 and at the focal length of a second partial optical unit 67 in the position of a pupil 69 of the illumination and detection optical unit 19. The partial optical units 65, 67 are also indicated as objectives 61.

In contrast to the solution from the prior art (FIG. 1), the illumination and detection optical unit 19 of the optical system 1 according to an embodiment of the invention is a focal-length-variable illumination and detection optical unit 19a.

Furthermore, it is evident that the optical system 1 according to an embodiment of the invention has a significantly smaller extent along a y-axis than the optical system 1 from the prior art in FIG. 1. Since no mirror, in particular no tilting mirror 51, is necessary in the illumination and detection optical unit 19 according to an embodiment of the invention, an extent along the x-axis can be reduced as well.

A further disadvantage of the solution from the prior art as shown in FIG. 1 should likewise be mentioned at this juncture. As a result of the tilting about the tilting axis 55, it is necessary to optimize downstream optical units for a spatially varying light incidence, that is to say that so-called scan lenses 74 are required.

The electronically tunable lens 71, hereinafter ETL 71, shown in FIG. 2 is shown purely by way of example in the form of a biconvex lens 75. However, in accordance with its control, the ETL 71 can also be a diverging lens (see FIG. 5c).

FIG. 2 furthermore shows merely a schematic illustration since, in a real configuration, control elements are also needed for varying the focal length of the ETL 71.

FIG. 2 furthermore schematically shows an ETL 71 according to the electrowetting principle 77. In the latter, a contact angle 79 of a liquid 83 provided on a transparent substrate 81 is varied by a voltage V being applied.

Furthermore, an ETL 71 is shown which receives liquid 83 in a volume 85, wherein the volume 85 is variable by means of a pump 87, a reservoir 89 and a flexible membrane 91 (illustrated in a dashed manner merely for differentiation) and enables different focal lengths f.

Both the ETL 71 according to the electrowetting principle 77 and the ETL 71 comprising the flexible membrane 91 can be used in the optical system 1 according to an embodiment of the invention. Further configurations of the ETL 71 are furthermore possible as well. It should be noted that the ETL 71 according to the electrowetting principle 77 requires a horizontal orientation of the transparent substrate 81 since otherwise gravity can deform the liquid 83 asymmetrically.

Figure 3:
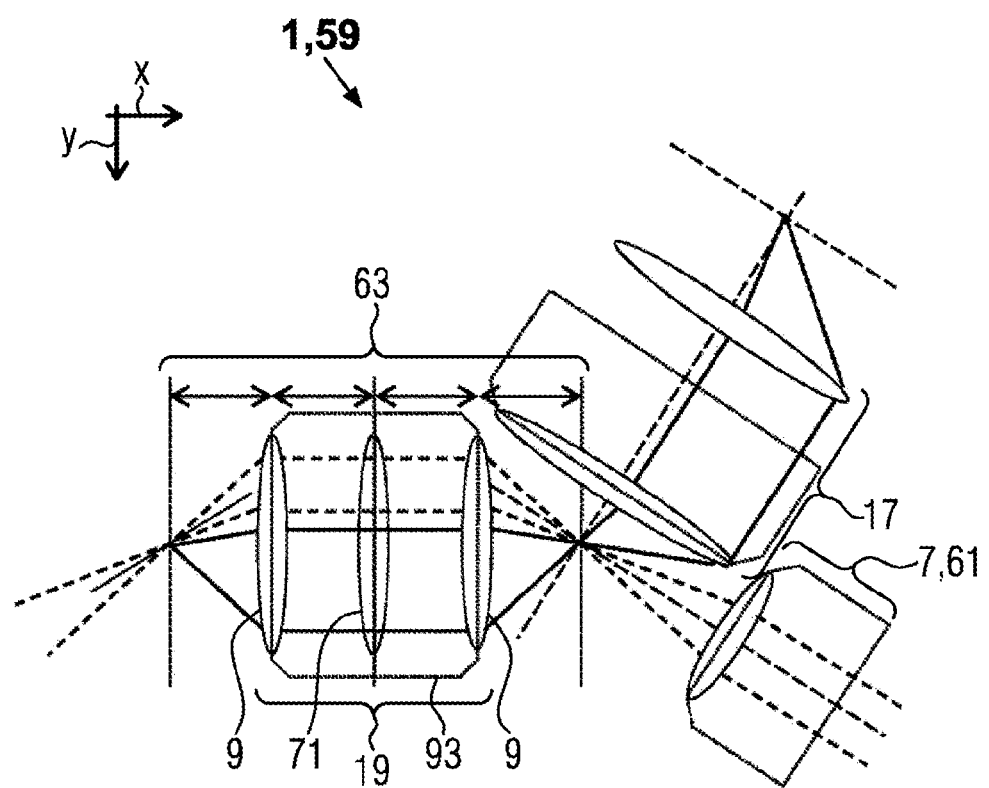
FIG. 3 shows a schematic illustration of a second configuration of the optical system according to the invention.

FIG. 3 shows a further configuration of the optical system 1 according to an embodiment of the invention, which optical system is also configured as an OPM microscope 59.

In this configuration, no partial optical units 65, 67 are provided, but rather a common housing 93 accommodating the lenses 9 and the ETL 71. Such a common housing 93 has the advantage that the adjustment of the lenses 9 and/or further optical elements of the illumination and detection optical unit 19 is carried out once and, after adjustment has been carried out, the illumination and detection optical unit 19 need only be adjusted as a unit and is exchangeable in a simple manner. Furthermore, accommodation in a common housing allows further miniaturization of the optical system 1.

The further set-up of the optical system 1, comprising the erecting optical unit 17, the illumination device 7 and the 4f set-up 63, is identical to the configuration in FIG. 2.

In the shown set-up of the optical system 1 according to an embodiment of the invention in FIG. 2, the pupil 69 lies outside the objectives 61 of the first partial optical unit 65 and second partial optical unit 67.

Figure 4:
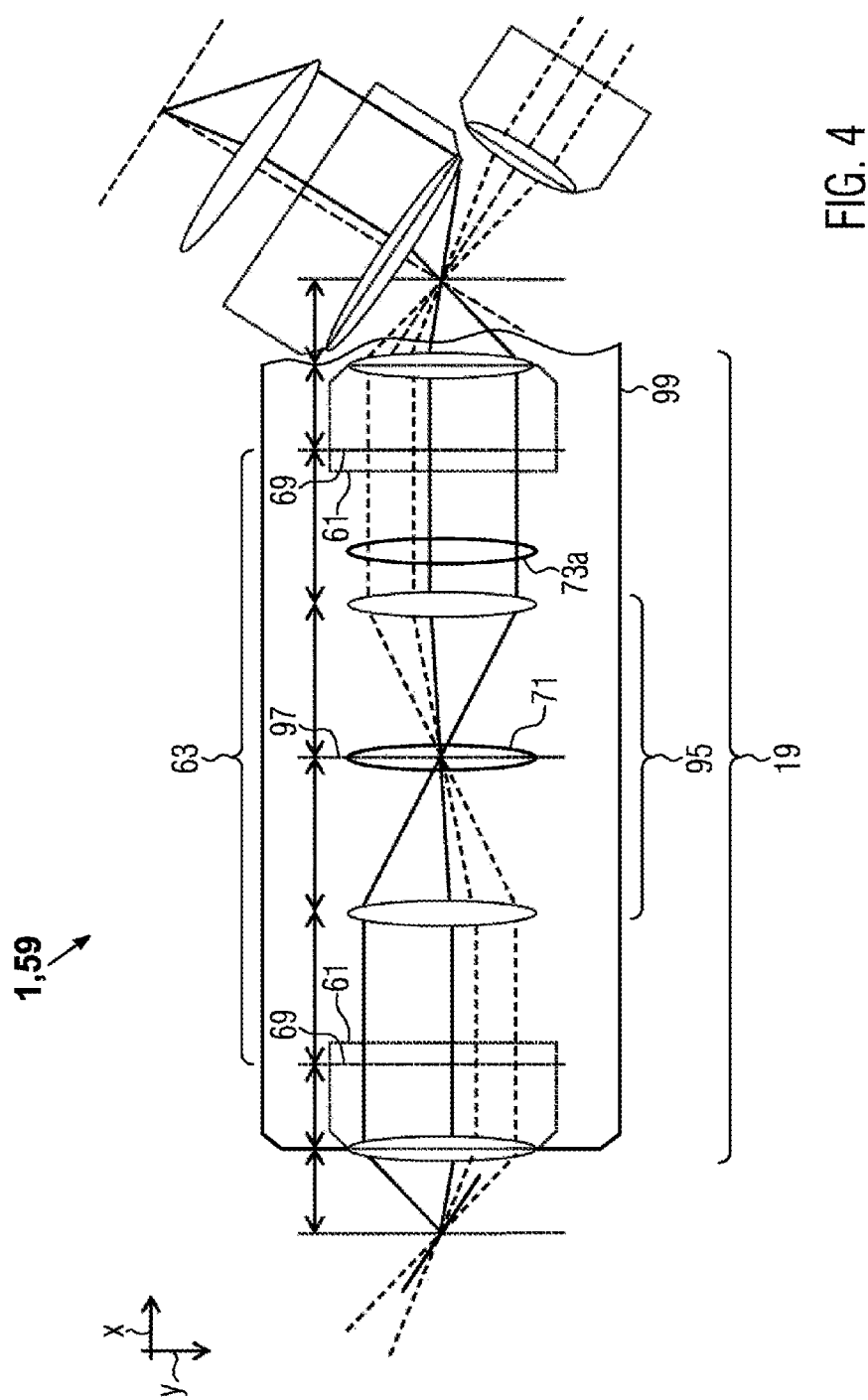
FIG. 4 shows a schematic illustration of a third configuration of the optical system according to the invention.

If the pupil 69 lies within the objective 61, however, as illustrated schematically in FIG. 4, then it may be possible that the ETL 71 cannot be positioned in the pupil 69.

The third configuration of the optical system 1 or OPM microscope 59 according to an embodiment of the invention as shown in FIG. 4 solves this problem by virtue of a telescope 95 being provided in the illumination and detection optical unit 19.

The telescope 95 is likewise configured in the 4f set-up 63 with regard to the two pupils 69 and has the advantage that it images the pupils 69 in an imaging plane 97 and the ETL 71 can be arranged at this position.

In this way, it is possible to enlarge an extent of the optical system 1, in particular of the illumination and detection optical unit 19, along the x-axis (also by means of further telescopes 95), which may be advantageous for miniaturization, for example. It would thus be conceivable to configure the illumination and detection optical unit 19 together with the telescope 95 (or a plurality of telescopes 95) in an endoscope 99.

Furthermore, FIG. 4 shows a further focal-length-variable optical element 73*a*, which enables the magnification of the optical system 1 to be set and adjusted.

FIGS. 5*a* to 5*c* elucidate the functioning of the ETL 71 and, in particular, the technical effect on the illumination plane 29 that is achieved therewith.

In the figures, a refractive power 101 of the ETL 71 is varied around 0. In FIG. 5*a*, a first refractive power 101*a* is 0, which results in a first focal length $f_a$ of infinity.

Correspondingly, FIGS. 5*b* and 5*c* show a second refractive power 101*b* and a third refractive power 101*c*, which result in a second focal length $f_b$ and a third focal length $f_c$, respectively.

In all cases the ETL 71 is situated at the focal length f of the lens 9 shown.

In FIG. 5*a*, neither the illumination path 21 of the illumination light 13 nor the detection path 39 of the scattered and/or fluorescent light 37 is altered by the ETL 71. The illumination plane 29 is imaged at the focal length f in a manner tilted with respect to the sample-side focal plane 31. The scattered and/or fluorescent light 37 is correspondingly collected from the shown illumination plane 29 and transmitted along the detection path 39.

If the second focal length $f_b$ of the ETL 71, which is greater than 0 ($f_b > 0$), is then set (FIG. 5*b*), it generates a first altered illumination path 21*b*, which differs from an original illumination path 21*a* in that it has a higher convergence 103.

The first altered illumination path 21*b* results in a displacement 105 of the illumination plane 29 from an original illumination plane 29*a* to a first altered illumination plane 29*b* along the optical axis 23. The displacement 105 is a parallel displacement 105*a*, such that a distance 107, measured along the optical axis 23, between the illumination planes 29*a* and 29*b* is constant over the complete illumination plane 29.

In FIG. 5*c*, the ETL 71 has a negative third focal length $f_c$ ($f_c < 0$), and so it generates a second altered illumination path 21*c*, which differs from the original illumination path 21*a* in that it has a higher divergence 109.

The second altered illumination path 21*c* likewise results in a displacement 105 of the illumination plane 29 from the original illumination plane 29*a* to a second altered illumination plane 29*c* along the optical axis 23, but in the opposite direction to what is the case in FIG. 5*b*. With a negative focal length $f_c$, too, the displacement 105 is a parallel displacement 105*a*, such that the distance 107 between the illumination planes 29*a* and 29*c* is also constant over the complete illumination plane 29.

The schematically illustrated displacement 105 of the illumination plane 29 thus makes it possible to scan the sample volume 33. For the sake of clarity, the sample volume 33 is shown only in FIG. 5*a* and is dependent on a longitudinal extent 111 of the illumination plane, and on a maximum displacement by which the illumination planes 29 can be displaced along the optical axis 23. The latter is in turn dependent on a maximum possible change in refractive power, which can be +/−5 diopters, for example.

While embodiments of the invention have been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below. Additionally, statements made herein characterizing the invention refer to an embodiment of the invention and not necessarily all embodiments.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

REFERENCE SIGNS

1 Optical system
3 3D scanning microscope
5 SCAPE microscope
7 Illumination device
9 Lens
11 Light source
13 Illumination light
15 Illumination focus
17 Erecting optical unit
19 Illumination and detection optical unit
21 Illumination path
21a Original illumination path
21b First altered illumination path
21c Second altered illumination path
23 Optical axis
25 Sample side
27 Light sheet
29 Illumination plane
29a Original illumination plane
29b First altered illumination plane
29c Second altered illumination plane
31 Sample-side focal plane
33 Sample volume
35 Sample
37 Scattered and/or fluorescent light
39 Detection path
41 Illumination side
43 Imaging focus
45 Real intermediate image
47 Sensor
49 Scanning device
51 Tilting mirror/galvanometer mirror
53 Tilting direction
55 Tilting axis
57 Illumination direction
59 OPM microscope
61 Objective
63 4f set-up
65 First partial optical unit
67 Second partial optical unit
69 Pupil
71 Electronically tunable lens
73 Focal-length-variable optical element
73a Further focal-length-variable optical element
74 Scan lens
75 Biconvex lens
77 Electrowetting principle
79 Contact angle
81 Transparent substrate
83 Liquid
85 Volume
87 Pump
89 Reservoir
91 Flexible membrane
93 Common housing
95 Telescope
97 Imaging plane
99 Endoscope
101 Refractive power
101a First refractive power
101b Second refractive power
101c Third refractive power
103 Convergence
105 Displacement
105a Parallel displacement
107 Distance
109 Divergence
111 Longitudinal extent
f Focal length
$f_a$ First focal length
$f_b$ Second focal length
$f_c$ Third focal length
V Voltage
y y-axis
x x-axis

The invention claimed is:

1. An optical system, comprising:
an illumination device configured to generate illumination light comprising a light sheet;
a scanning device comprising a focal-length-variable illumination and detection optical unit having an optical axis, the scanning device being configured to generate a temporal sequence of at least two tilted illumination planes for illuminating a stationary sample volume, the at least two tilted illumination planes being tilted with respect to the optical axis and arranged at a distance from one another and parallel to one another; and
an erecting optical unit configured to image an image of the at least two tilted illumination planes in a planar manner in a detector plane.

2. The optical system as claimed in claim 1, wherein the scanning device has no mirrors.

3. The optical system as claimed in claim 1, wherein the focal-length-variable illumination and detection optical unit is configured for transmission of the illumination light to the sample volume and for transmission of scattered and/or fluorescent light from the sample volume into the erecting optical unit.

4. The optical system as claimed in claim 3, wherein the illumination and detection optical unit comprises a focal-length-variable optical element.

5. The optical system as claimed in claim 4, wherein the focal-length-variable optical element is configured as an electronically tunable lens.

6. The optical system as claimed in claim 4, wherein the focal-length-variable optical element is arranged in a pupil of the illumination and detection optical unit.

7. The optical system as claimed in claim 4, wherein a telescope is disposed in the illumination and detection optical unit, the telescope being configured to image a pupil of a partial optical unit of the illumination and detection optical unit, and
wherein the focal-length-variable optical element is arranged in a position of the imaging of the pupil.

8. The optical system as claimed in claim 4, further comprising:
a further focal-length-variable optical element,
wherein a magnification of the optical system is changeable by the further focal-length-variable optical element.

9. The optical system as claimed in claim 3, wherein the illumination device and the erecting optical unit are configured to be rotatable with one another about the optical axis.

10. A method for illuminating a sample volume, the method comprising:

generating illumination light comprising a light sheet;

offsetting, by a scanning device comprising a focal-length-variable illumination and detection optical unit having an optical axis, a temporal sequence of tilted illumination planes representing the light sheet in a stationary sample volume parallel to one another, the tilted illumination planes being tilted with respect to the optical axis; and using an erecting optical unit to image an image of the at least two tilted illumination planes in a planar manner in a detector plane.

11. The method as claimed in claim 10, further comprising jointly rotating an illumination device and the erecting optical unit about an optical axis of the scanning device so as to illuminate the sample volume from different directions.

12. The method as claimed in claim 10, further comprising:

feeding illumination light of an illumination device into the scanning device and transmitting the illumination light along a non-paraxial illumination path;

transmitting the illumination light through the scanning device and varying convergence or divergence of the illumination light by the scanning device;

illuminating the sample volume with the tilted illumination planes, wherein varying the convergence or divergence of the illumination light by the scanning device brings about parallel displacement of the tilted illumination planes along the optical axis;

collecting scattered and/or fluorescent light from the sample volume by the scanning device and transmitting the scattered and/or fluorescent light along a non-paraxial detection path by the scanning device; and erecting the scattered and/or fluorescent light by the erecting optical unit.

13. The method according to claim 10, wherein the sample volume is in an optical system.

* * * * *